(12) United States Patent
Kim et al.

(10) Patent No.: US 8,476,802 B2
(45) Date of Patent: Jul. 2, 2013

(54) CORE AND MOTOR HAVING THE SAME

(75) Inventors: Nam Seok Kim, Gyunggi-do (KR); Pyo Kim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 192 days.

(21) Appl. No.: 12/929,256

(22) Filed: Jan. 11, 2011

(65) Prior Publication Data
US 2011/0309710 A1 Dec. 22, 2011

(30) Foreign Application Priority Data
Jun. 16, 2010 (KR) ........................ 10-2010-0057047

(51) Int. Cl.
*H02K 1/06* (2006.01)

(52) U.S. Cl.
USPC .................................. 310/216.004; 310/67 R

(58) Field of Classification Search
USPC ............................. 310/67 R, 216.004, 254.1
See application file for complete search history.

(56) References Cited

U.S. PATENT DOCUMENTS

| 5,663,601 A * | 9/1997 | Wakabayashi et al. | 310/45 |
| 7,268,450 B2 * | 9/2007 | Takeuchi | 310/52 |
| RE43,055 E * | 1/2012 | Takeuchi | 310/52 |
| 2005/0146234 A1* | 7/2005 | Hashiba et al. | 310/64 |

FOREIGN PATENT DOCUMENTS

| CN | 1404202 A | 3/2003 |
| JP | 06-141516 | 5/1994 |
| JP | 8-340659 | 12/1996 |
| JP | 2003-9434 | 1/2003 |

OTHER PUBLICATIONS

Korean Office Action issued Jun. 16, 2011 in corresponding Korean Patent Application 10-2010-0057047.
Chinese Office Action mailed Apr. 1, 2013 for corresponding Chinese Application No. 201110034915.0.

\* cited by examiner

*Primary Examiner* — Thanh Lam

(57) ABSTRACT

Disclosed is a core including a plurality of core layers in a laminated structure formed through one-directional press shearing and having an insulating layer formed on the surface thereof prevented from being damaged by burrs formed through the press shearing when a winding coil is wound on and around the core, and a motor having the core. The core for a motor includes: a plurality of core plates having a laminated structure formed through one-directional press shearing; and a chamfered portion formed on at least some of the corners of a face opposed to one face of the core plate to which force is applied by the press shearing.

10 Claims, 4 Drawing Sheets

CORE AND MOTOR HAVING THE SAME

CROSS-REFERENCE TO RELATED APPLICATIONS

This application claims the priority of Korean Patent Application No. 10-2010-0057047 filed on Jun. 16, 2010, in the Korean Intellectual Property Office, the disclosure of which is incorporated herein by reference.

BACKGROUND OF THE INVENTION

1. Field of the Invention

The present invention relates to a core and a motor having the same and, more particularly, to a core devised to prevent an insulation film formed on the surface of the core from being damaged when a winding coil is wound, and a motor having the core.

2. Description of the Related Art

In general, a spindle motor installed in an optical disc drive serves to rotate a disc to allow an optical pick-up mechanism to read data recorded on the disc.

Recently, as demand for the portability of optical disc drives has increased, a motor for use in the optical disc driver has been required to become thinner and lighter.

Thus, in order to meet demand, an insulation film is formed by employing a thin film coating technique to reduce the insulation thickness between a core and a winding coil used in the motor.

The core currently used for the motor is fabricated to have a desired shape by laminating (or stacking) a plurality of metal layers and then shearing the metal layer through pressing. In this case, however, the core plates constituting the respective layers of the core formed through this process have burrs produced in the direction in which the press shearing was performed.

When a thin insulating layer is formed in a state in which the core plates have burrs, it is possible that the insulating layer may be formed to have a significantly smaller thickness in the portion in which the burrs are present, and while a winding coil is wound on and around the core, the insulating layer may be damaged by the burrs having a form of a sharp, pointy projection as the tensile force increases by the wound coil.

The damage to the core and insulation of the winding coil results in the degradation of the performance and characteristics of the motor.

Thus, a technique for preventing the insulating layer from being damaged even in the case that it is formed to have a small thickness is required.

SUMMARY OF THE INVENTION

An aspect of the present invention provides a core including a plurality of core layers in a laminated (or stacked) structure formed through one-directional press shearing and having an insulating layer formed on the surface thereof prevented from being damaged by burrs formed through the press shearing when a winding coil is wound on and around the core, and a motor having the core.

According to an aspect of the present invention, there is provided a core for a motor, including a plurality of core plates having a laminated structure formed through one-directional press shearing; and a chamfered portion formed on at least some of the corners of a face opposed to one face of the core plate to which force is applied by the press shearing.

The chamfered portion may be formed on a core plate on which press shearing is finally performed among the plurality of core plates.

The chamfered portion may be formed on each of the plurality of core plates.

The chamfered portion may have a depth which is 50% smaller than the thickness of the core plate.

The chamfered portion may be formed on an area wound around which the winding coil is wound among corners of the face opposed to one face of the core plate to which force is applied by the press shearing.

The chamfered portion may be formed on the entirety of the corners of the face opposed to one face of the core plate to which force is applied by the press shearing.

According to another aspect of the present invention, there is provided a motor including: a core including a plurality of core plates having a laminated structure formed through one-directional press shearing and a chamfered portion formed on at least some of the corners of a face opposed to one face of the core plate to which force, is applied by the press shearing, and having a winding coil wound thereon; and a rotor including a magnet interacting with the coil to generate an electromagnetic force and rotating a shaft.

BRIEF DESCRIPTION OF THE DRAWINGS

The above and other aspects, features and other advantages of the present invention will be more clearly understood from the following detailed description taken in conjunction with the accompanying drawings, in which:

FIGS. 3a, 3b, 4a and 4b are sectional views of the core taken along line B-B' according to an exemplary embodiment of the present invention, wherein FIGS. 3a and 3b are sectional views of the core with burrs formed during a fabrication process, and FIGS. 4a and 4b are sectional views of the core with chamfered portions formed through a chamfering process.

DETAILED DESCRIPTION OF THE PREFERRED EMBODIMENT

Figure 1:
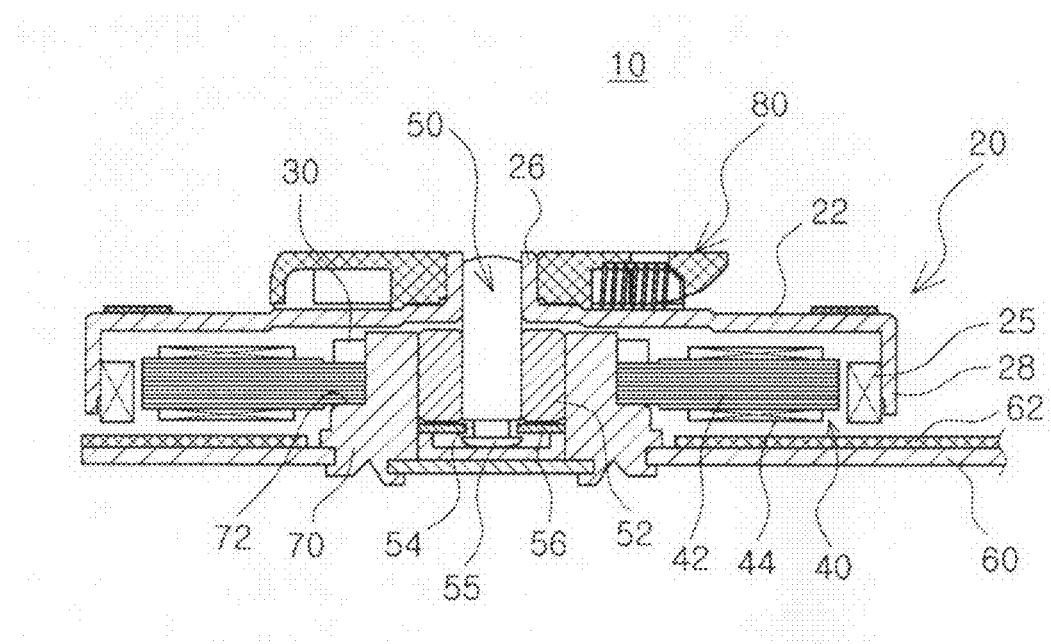
FIG. 1 is a schematic sectional view of a motor employing a core according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

Motor

FIG. 1 is a schematic sectional view of a motor employing a core according to an exemplary embodiment of the present invention.

With reference to FIG. 1, a motor 10 according to an exemplary embodiment of the present invention is a spindle motor applied to an optical disc drive for rotating a disc, which includes a rotor 20 and a stator 40.

The rotor 20 includes a cup shaped rotor case 110 having an annular magnet 25, which corresponds to a coil 44 of the stator 40, provided on an outer circumferential portion thereof. The magnet 25 is a permanent magnet having an N pole and an S pole magnetized alternately in a circumferential direction to generate a magnetic force of a certain strength.

The rotor case 22 includes a rotor hub 26 press-fit to be fastened to a shaft 50 and a magnet coupling part 28 having the annular magnet 25 disposed on an inner circumferential surface. The rotor hub 26 may be formed to be bent upward in a shaft direction in order to maintain a drawing force with the shaft 50. A chucking mechanism 80 for mounting a disc (D) thereon is coupled on an outer circumferential surface of the rotor hub 26.

The stator 40 refers to all of the fixed members, excluding rotary members. The stator 40 includes a base plate 60 on which a printed circuit board (PCB) is installed, a sleeve holder 70 press-fitting a sleeve 52 to support the sleeve 52, a core 42 fixed to the sleeve holder 70, and a winding coil 44 wound on and around the core 44.

The magnet 25 provided on the inner circumferential surface of the magnet coupling part 28 is disposed to face the winding coil 44, and the rotor 20 rotates according to electromagnetic interaction between the magnet 25 and the winding coil 44. In other words, when the rotor case 22 rotates, the shaft 50 interworking with the rotor case 22 is rotated.

Terms regarding directions are defined as follows: A shaft direction refers to a vertical direction on the basis of the shaft 50, and an outer diameter or inner diameter direction refers to an outer end direction of the rotor 20 on the basis of the shaft 50 or a central direction of the shaft 50 on the basis of the outer end of the rotor 20.

The shaft 50 may have a lower end portion 55 exposed from a lower side in the axial direction of the sleeve 52. Here, in order to prevent the shaft 50 from being separated from the sleeve 52, a stopper ring fastening recess 54 may be formed at the lower end portion 55 of the shaft 50. A stopper ring 56 disposed on a lower surface of the sleeve 52 is coupled to the stopper ring fastening recess 54.

In the present exemplary embodiment, the sleeve holder 70 may have the sleeve 52, supporting the shaft 50, press-fit therein, and include a mounting portion 72 extending in the outer diameter direction to form a step so as for the stator core 42 to be mounted on an outer portion thereof.

Core

Figure 2A:
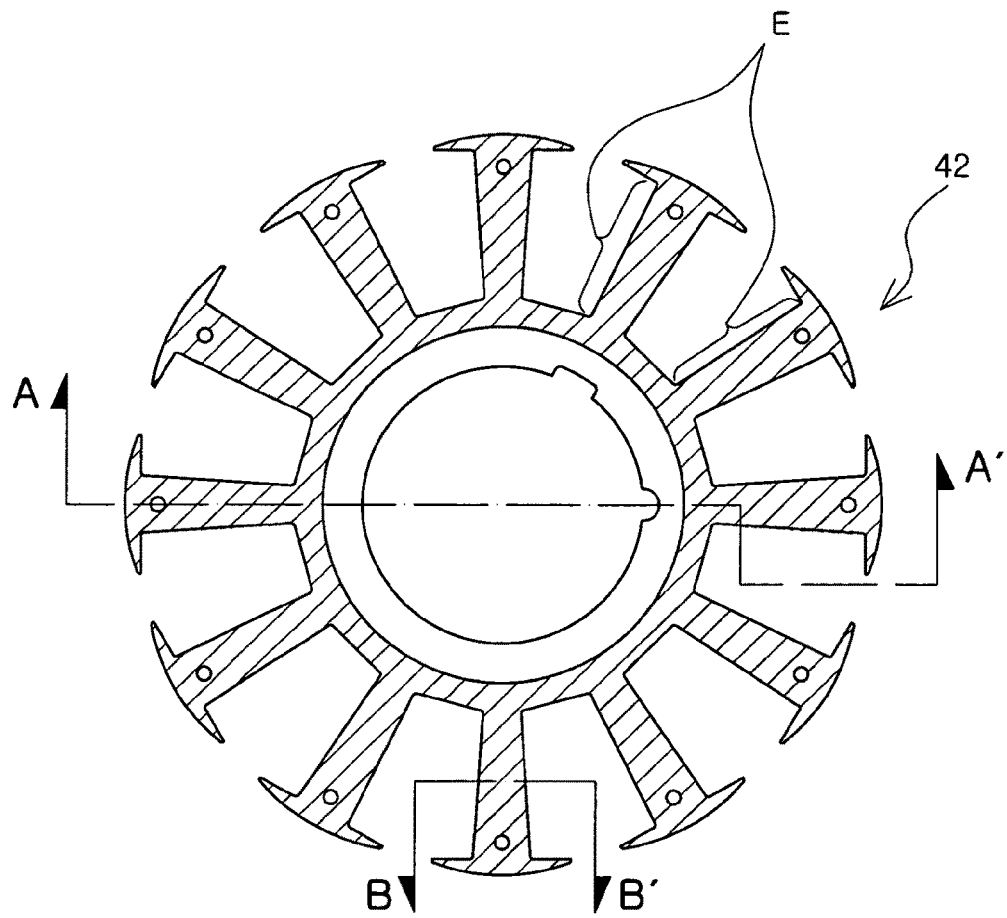
FIG. 2a is a plan view of the core according to an exemplary embodiment of the present invention.
Figure 2B:
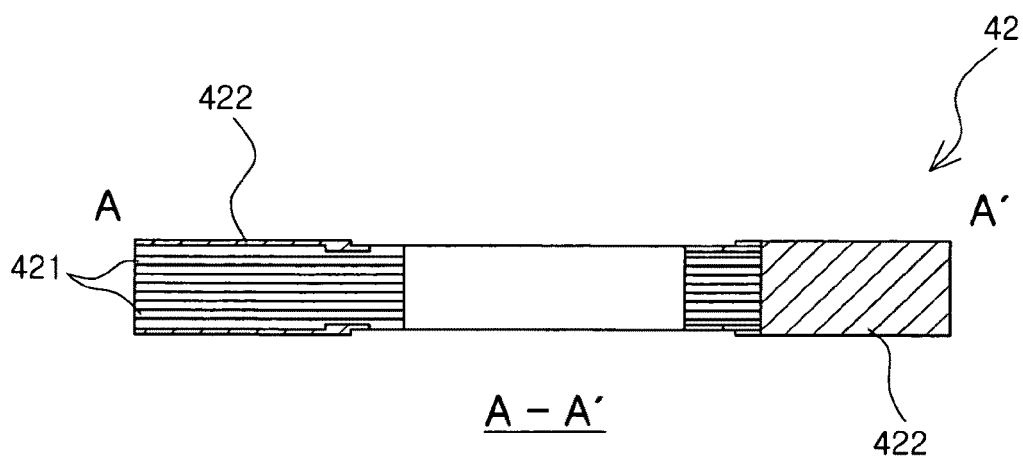
FIG. 2b is a sectional view of the core taken along line A-A' in FIG. 2 according to an exemplary embodiment of the present invention.

FIG. 2a is a plan view of the core according to an exemplary embodiment of the present invention, and FIG. 2b is a sectional view of the core taken along line A-A' in FIG. 2 according to an exemplary embodiment of the present invention.

As shown in FIG. 2a, the core 42 according to an exemplary embodiment of the present invention has a structure including a plurality of teeth portions (E) extending radially based on a rotational shaft.

As shown in FIG. 2b, the core 42 according to an exemplary embodiment of the present invention has a structure in which a plurality of core plates 421 having such a shape as shown in FIG. 2a are laminated (or stacked).

The teeth portions of the core 42 are an area on which the winding coil 44 (See FIG. 1) is wound in a covering manner, and in order to stably drive the motor, insulation must be secured between the core 42 and the winding coil 44. To this end, an insulating layer 422 is formed on the surface of the core 42, in particular, the surface of the teeth portions (E), by using an insulating resin material.

Meanwhile, as for the core used in a small spindle motor, a plurality of metal plates constituting core plates are laminated and pressed, thereby forming the core structure having the teeth portions (E) radially formed based on the rotational shaft as shown in FIG. 2a.

Thus, because the plurality of metal plates are laminated and then pressed, burrs are generated at the edges of the respective core plates in the direction in which force is applied in the pressing operation, namely, in the direction of press shearing.

Figure 3A:
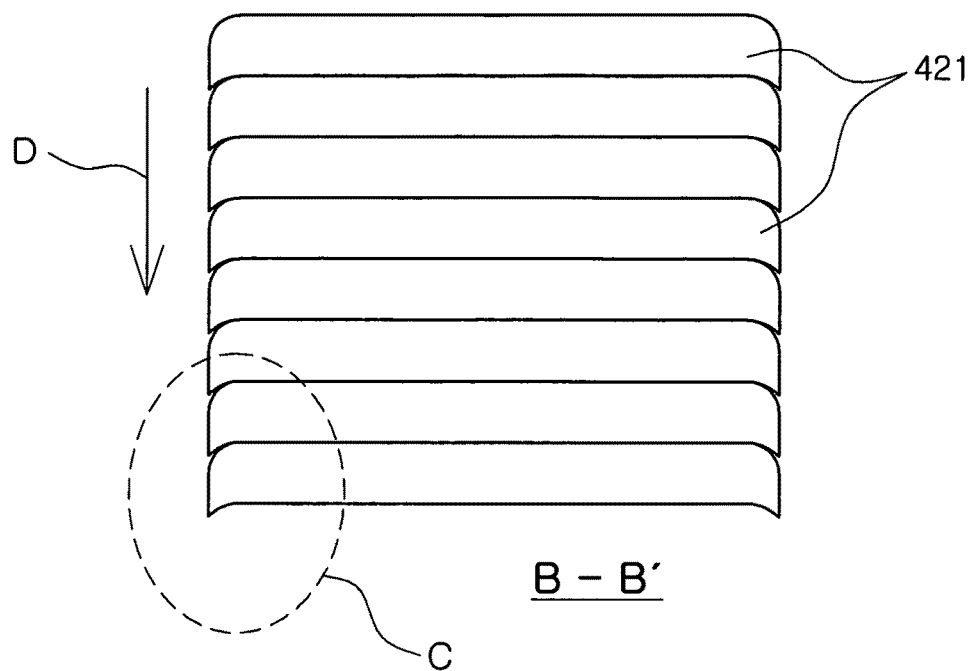
Figure 3B:
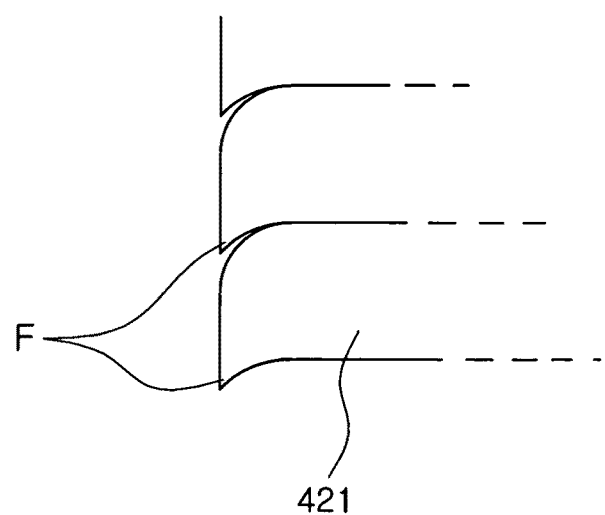

FIGS. 3a and 3b illustrate the form of burrs formed in the process of fabricating the core. Specifically, FIG. 3a is a sectional view of the teeth portion of the core around which the winding coil is wound taken along line B-B' in FIG. 2a, and FIG. 3b is an enlarged view of a portion 'C' in FIG. 3a.

As shown in FIGS. 3a and 3b, because the plurality of metal plates are laminated and then pressed, burrs (F) are generated in the direction of press shearing (D) at the corners of a face opposed to a face of each of the core layers 421 to which force is applied by the press shearing.

As shown in FIGS. 3a and 3b, the burrs (F) formed at each of the core plates 421 have the form of a sharp, pointy projection at one surface of each of the core plates 421. Thus, if the insulating layer is formed and the winding coils are wound without removing the burrs (F), the burrs (F) would possibly damage the insulating layer as the tensile force of the winding coil acts on the resin layer. The damage to the insulating layer significantly degrades the characteristics of the motor.

Figure 4A:
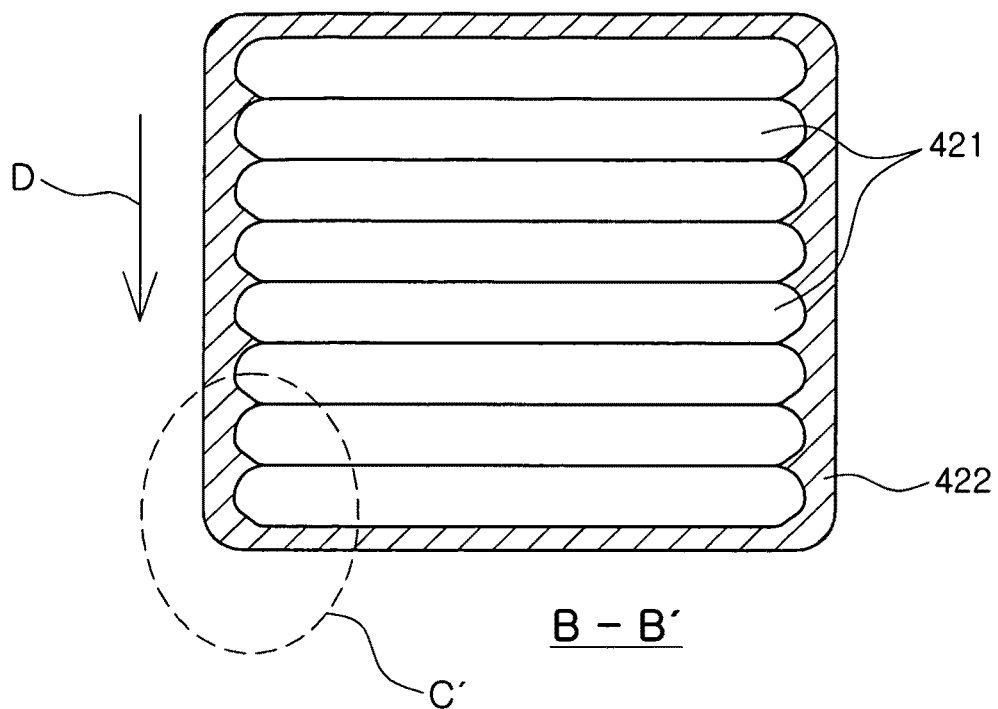
Figure 4B:
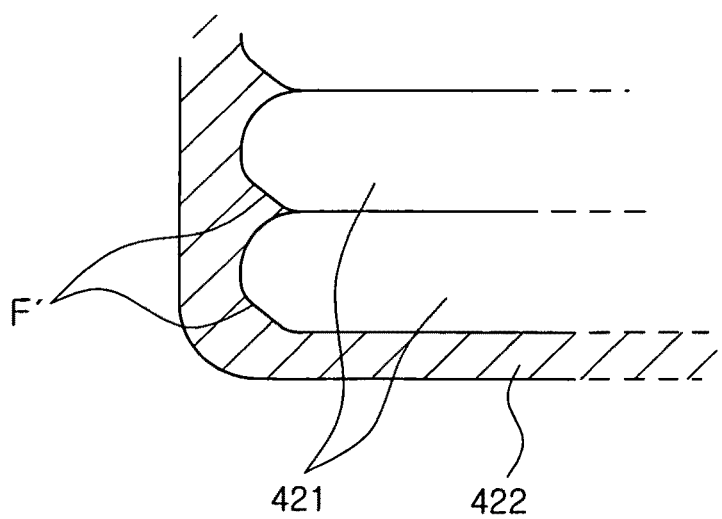

Thus, in order to solve this problem, in an exemplary embodiment of the present invention, a chamfered portion is formed on the core 42. FIG. 4a is a sectional view of the core 42 with the insulating layer 422 made of a resin material such as epoxy, or the like, formed thereon after a chamfered portion is formed. FIG. 4b is an enlarged view of a portion 'C'' of FIG. 4a. As shown In FIGS. 4a and 4b, a chamfering process is performed on one surface of the core 42, namely, on the corners of the face opposing the face to which force is applied by press shearing to remove burrs (F) as shown in FIG. 3 and form a chamfered portion (F').

In an exemplary embodiment of the present invention, the chamfered portion (F') may be formed on the lowermost core plate of the core illustrated in FIGS. 3 and 4. The lowermost core plate is a core plate upon which the press shearing is finally performed, among the plurality of core plates. Because the corners of the lowermost core plate are directly in contact with the insulating layer 422 to be formed in a follow-up process, the chamfered portion may be formed to remove the burrs formed at the corners of the lowermost core plate.

In addition, as shown in FIGS. 3 and 4, burrs may possibly be formed on the entire core layers by the press shearing, so although the possibility that burrs formed at the intermediate core layers causes damage to the insulating layer is low, chamfered portions may be formed on the intermediate core layers.

In an exemplary embodiment of the present invention, the depth of the chamfered portion (F') may be 50% or smaller than that of the thickness of the core plate. This is because the core plates forming the core to be applied to a small spindle motor are very thin, so if the depth of the chamfered portion is more than 50% of the thickness of the core plate, the core plates themselves could possibly be damaged.

In addition, the core according to an exemplary embodiment of the present invention is formed by laminating metal plates for forming core plates and pressing them. In this case, the chamfered portion (F') is formed at the corner of the face opposing the face to which force is applied by press shearing, while a chamfered portion is not formed on the face too which force is applied by press shearing.

Meanwhile, the chamfered portion may be limitedly formed only at the teeth portions (E), the area of the core 44 on which the winding coil is wound, or the chamfered portion may be formed on the entirety of the corners of the core layers of the core 44 by collectively applying a chamfering process.

As described above, the chamfer portion is formed to effectively remove burrs formed by a pressing operation in the course of manufacturing the multilayered core including a plurality of core plates as laminated, thus preventing the insulating layer formed on the surface of the core from being damaged by the winding coil wound on and around the core.

Therefore, a defective operation of the spindle motor can be reduced and the operational reliability can be improved.

As set forth above, according to exemplary embodiments of the invention, because the chamfered portion is formed to effectively remove burrs created during pressing in the course of fabricating the core having a multi-layered structure by laminating a plurality of core plates, damage to the insulating layer formed on the surface of the core due to the winding coil wound on and around the core can be prevented.

In addition, a defective operation of the spindle motor can be reduced, and operational reliability can be improved.

While the present invention has been shown and described in connection with the exemplary embodiments, it will be apparent to those skilled in the art that modifications and variations can be made without departing from the spirit and scope of the invention as defined by the appended claims.

What is claimed is:

1. A core for a motor, the core comprising:
   a plurality of core plates having a laminated structure formed through one-directional press shearing; and
   a chamfered portion formed on at least some of the corners of a face opposed to one face of the core plate to which force is applied by the press shearing,
   wherein the chamfered portion is formed on each of the plurality of core plates.

2. The core of claim 1, wherein the chamfered portion is formed on a core plate on which press shearing is finally performed among the plurality of core plates.

3. The core of claim 1, wherein the chamfered portion has a depth which is 50% smaller than the thickness of the core plate.

4. The core of claim 1, wherein the chamfered portion is formed on an area around which the winding coil is wound among corners of the face opposed to one face of the core plate to which force is applied by the press shearing.

5. The core of claim 1, wherein the chamfered portion is formed on the entirety of the corners of the face opposed to one face of the core plate to which force is applied by the press shearing.

6. A motor comprising:
   a core including a plurality of core plates having a laminated structure formed through one-directional press shearing and a chamfered portion formed on at least some of the corners of a face opposed to one face of the core plate to which force is applied by the press shearing, and having a winding coil wound thereon; and
   a rotor including a magnet interacting with the coil to generate an electromagnetic force and rotating a shaft,
   wherein the chamfered portion is formed on each of the plurality of core plates.

7. The motor of claim 6, wherein the chamfered portion is formed on a core plate on which press shearing is finally performed among the plurality of core plates.

8. The motor of claim 6, wherein the chamfered portion has a depth which is 50% smaller than the thickness of the core plate.

9. The motor of claim 6, wherein the chamfered portion is formed on an area around which the winding coil is wound among corners of the face opposed to one face of the core plate to which force is applied by the press shearing.

10. The motor of claim 6, wherein the chamfered portion is formed on the entirety of the corners of the face opposed to one face of the core plate to which force is applied by the press shearing.

* * * * *